United States Patent [19]

Kimura et al.

[11] 3,843,609
[45] Oct. 22, 1974

[54] TEREPHTHALAMIDE POLY BIS(PROPOXY)ALKYLENE

[75] Inventors: Isao Kimura; Masao Matsui; Hiroshi Takahashi; Shizume Takemoto, all of Osaka, Japan

[73] Assignee: Kanebo Ltd., Tokyo, Japan

[22] Filed: Oct. 16, 1972

[21] Appl. No.: 297,971

Related U.S. Application Data

[63] Continuation-in-part of Ser. No. 65,641, Aug. 20, 1970, Pat. No. 3,729,449.

[30] Foreign Application Priority Data

| Aug. 27, 1969 | Japan | 44-67744 |
| Dec. 4, 1969 | Japan | 44-97690 |
| Apr. 13, 1970 | Japan | 45-31387 |
| Apr. 21, 1970 | Japan | 45-34025 |
| Apr. 23, 1970 | Japan | 45-35046 |
| May 26, 1970 | Japan | 45-45418 |

[52] U.S. Cl. ............ 260/78 R, 161/177, 161/227, 260/33.4 R, 260/33.6 R, 260/45.7 P, 260/45.75 C, 260/45.95 H, 260/78 S, 260/857 TW, 260/857 UN, 260/171, 260/210 F

[51] Int. Cl. ............................................ C08g 20/20

[58] Field of Search .............. 260/78 R, 78 S, 78 SS

[56] References Cited

UNITED STATES PATENTS

| 2,493,597 | 1/1950 | Rothrock et al. | 260/78 SC |
| 2,557,808 | 6/1951 | Walker | 260/78 SC |
| 3,396,151 | 8/1968 | Caldwell | 260/78 R |
| 3,499,853 | 3/1970 | Griebsch et al. | 260/78 R |

FOREIGN PATENTS OR APPLICATIONS

| 615,954 | 1/1949 | Great Britain | 260/78 R |

*Primary Examiner*—Harold D. Anderson
*Attorney, Agent, or Firm*—Woodhams, Blanchard and Flynn

[57] ABSTRACT

A polyamide consisting of a substantial homopolymer of poly-bis(propoxy) alkylene terephthalamide having the recurring structural unit of the formula

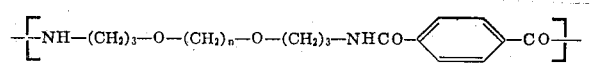

, wherein $n$ is 3 or 4 has an improved modulus, antistatic property and heat stability.

6 Claims, 13 Drawing Figures

TEREPHTHALAMIDE POLY BIS(PROPOXY)ALKYLENE

CROSS REFERENCE TO RELATED APPLICATION

This is a continuation-in-part of our copending application Ser. No. 65,641, filed Aug. 20, 1970 now U.S. Pat. No. 3,729,449.

The present invention realtes to novel polyamides having an excellent heat stability and a high modulus.

As polyamides for clothing, large amounts of polycaprolactam (hereinafter abridged as nylon-6) and polyhexamethylene adipamide (nylon-66) are produced at present. One of the drawbacks of these polyamides is their low modulus (initial modulus). In order to overcome this drawback, several polyamides having a high modulus have been proposed. For example, the inventors have already proposed a copolyamide consisting mainly of poly-undecamethylene terephthalamide (11T). While, poly-bis (para-aminocyclohexyl)methane azelamide (PACM-9), poly-bis (para-aminocyclohexyl)methane decanamide (PACM-12), poly-paraxylylene decanamide (PXD-12) and the like have been proposed.

Fibers prepared from polyamides having aromatic nuclei or cyclohexane rings have a high modulus, but there are various drawbacks in the production of these fibers. One of these drawbacks is that these polyamides have a high melting point and melt viscosity, and consequently the melt polymerization and melt spinning are difficult. In order to lower the melting point and melt viscosity, it has been attempted to introduce a long methylene chain having at least 7 carbon atoms into the recurring structural units of the polyamide. In the above described method, 1,11-undecamethylenediamine, azelaic acid, 1,10-decamethylene dicarboxylic acid and the like have been used as a polyamide forming material. However, it is very difficult and expensive to produce polyamide forming materials having a long methylene chain, and the use of these polyamide forming materials is not advantageous.

A polyamide prepared from bis(3-aminopropoxy)ethane and terephthalic acid has been described in British Patent No. 615,954. This polyamide is deficient in heat stability so that thermal decomposition, discoloration and decrease of viscosity occur when it is maintained in a molten condition for a substantial period of time. This may occur, for example, during commercial melt spinning procedures.

The first object of the present invention is to provide novel polyamides having both a high heat stability and a high modulus, which can be produced relatively easily and inexpensively, and fibers prepared from the polyamides.

The second object of the invention is to provide novel polyamide fibers having an excellent antistatic property and gloss, and a method for producing the fibers.

The third object of the invention is to provide an improved method for increasing the polymerization degree in the polymerization reaction for producing the above described highly elastic polyamide.

The fourth object of the invention is to provide an improved method for increasing the modulus of fibers in the method for producing the above described highly elastic poly-amide fibers.

The fifth object of the invention is to provide composite filaments having an improved elastic property and flexural rigidity.

The other objects of the invention will be apparent from the following description.

The present invention provides a substantial homopolymer of poly-bis(propoxy)alkylene terephthalamide having the recurring structural unit shown by the following formula I.

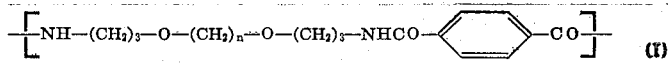

wherein $n$ is a positive integer of 3 or 4, and fibers composed of the polymer.

The term "substantial homopolymer" herein includes homopolymers, and copolymers and polymer blends containing a small amount, for example, less than 5 percent by weight, preferably less than 3 percent by weight, of a second component within such a range that the preferable properties of the homopolymer are not substantially changed.

For convenient reference, the polymer of British Patent No. 615,954, wherein $n$ is 2 in the above formula I, that is, poly-1,2-bis(propoxy)ethane terephthalamide, is hereinafter referred to as polyamide 30203T. In the same manner, the polymer according to the present invention when $n$ is 3, that is, poly-1,3-bis(propoxy) propane terephthalamide, is referred to as polyamide 30303T, and the polymer according to the present invention when $n$ is 4, that is, poly-1,4-bis(propoxy)butane terephthalamide, is referred to as polyamide 30403T.

The polyamides according to the present invention can be obtained by polymerizing 1,3-bis(γ-aminopropoxy)propane or 1,4-bis(γ-aminopropoxy)butane with terephthalic acid. For example, these polyamides can be produced by heating and polymerizing a mixture containing substantially equimolar amounts of the etherdiamine and terephthalic acid or a salt (nylon salt) of the etherdiamine with terephthalic acid, or by reacting equimolar amounts of the etherdiamine and terephthalic acid ester, but these polyamides can be most advantageously produced from the nylon salt.

The above-mentioned etherdiamine can be produced relatively easily. That is, when 1,3-propanediol (trimethylene glycol) or 1,4-butanediol (tetramethylene glycol) is cyanoethylated by the addition of acrylonitrile, and the resulting dinitrile is reduced by hydrogen, the etherdiamine can be easily obtained. Among the glycols, butanediol is available very inexpensively, but trimethylene glycol is relatively expensive at present (this may be available inexpensively in future). Glycols having at least 5 carbon atoms are highly expensive, and moreover polyamides obtained by polymerizing long chain etherdiamines, which are obtained by cyanoethylation of these glycols, and terephthalic acid have a low modulus and melting point as described later, and therefore the use of such glycols is not suitable for the purposes of the present invention. Polyamide 30203T prepared from ethylene glycol is deficient in heat stability and is not suitable for the purposes of the present invention.

It has been found that substantial homopolymers of polyamide 30303T and polyamide 30403T have an excellent crystallinity and fiber forming ability, and fibers prepared therefrom have an excellent strength, elongation, and dyeability and further have a higher modulus and more excellent gloss and antistatic property than the conventional polyamide fibers. Moreover, homopolymers of polyamide 30303T and polyamide 30403T are unexpectedly superior in heat stability to homopolymers of polyamide 30203T.

There have hitherto been known some polyamides having ether linkages, that is, polyetheramides. For example, straight chain polyetheramides have been proposed as hydrophilic polymers, for example, water soluble polymers, but they are not suitable for producing excellent fibers for clothing. Furthermore, polybis(propyl)ether terephthalamide (hereinafter referred to as polyamide 303T), one of the polyether terephthalamides, has been known. However, polyamide 303T has a too high melting point (284°C) and it is very difficult to polymerize and spin. Moreover, polyamide 303T is poor in crystallinity. It has generally been known that when terephthalamides are polymerized at a temperature higher than 280°C, cross-linkages are easily formed. Polyamide 303T is required to be polymerized and spun at a very high temperature (higher than 290°C), and consequently polyamide 303T easily decomposes and further crosslinkages are liable to be formed.

Polyamide 30303T and polyamide 30403T are remarkably superior to these conventional polyetheramides in crystallinity and fiber property. Moreover, the melting point of polyamide 30303T is about 227°C and that of polyamide 30403T is about 222°C, and these polyamides are suitable for melt polymerization and spinning. Although the prior art polyamide 30203T has a melting point of about 245°C, its heat stability is remarkably poor in comparison to polyamides 30303T and 30403T according to the present invention.

The inventors have already proposed a composite filament containing a copolyamide of polyetheramide as one component in U.S. Pat. No. 3,397,107, and showed a copolymer of polyamide 30203T with nylon-6 (copolymerization ratio = 10/90) as an embodiment of the copolyamide. However, in the U.S. Pat. No. 3,397,107, such copolyamide having ether linkages is used as a component having a low crystallinity and a high shrinkability in combination with nylon-6 or nylon-66 having a high crystallinity and a low shrinkability in order to produce composite filaments having a spontaneous crimpability. Therefore, the copolyamide is entirely different from the substantial homopolymer having a high crystallinity according to the present invention.

The polyamide according to the present invention includes complete homopolyamides, or copolyamides or polymer blends containing a small amount of at least one second component within such an amount that these copolyamides and polymer blends are regarded as substantial homopolyamides. When the amount of the second component to be copolymerized or blended is too large, for example, more than 6 percent, particularly more than 10 percent, the preferred properties of the homopolyamide, for example, the high crystallinity and modulus and the excellent antistatic property and gloss are often lost. Consequently it is required that the amount of the second component is less than 5 percent by weight.

As the second component to be mixed with the polyamide of the present invention, mention may be made of, for example, modifiers, stabilizers, coloring agents, pigments and other polymers. Particularly, since polyetheramide often has poor resistance against oxidation by heat and light, it is desirable that there is added to the polyetheramide antioxidants, such as copper, manganese and phosphide compounds; phenol series organic stabilizers (radical scavenger and the like), such as 2,6-bis(t-butyl)cresol and the like; and conventional ultraviolet-ray absorbers. As the second component to be copolymerized with the polyetheramide, mention may be made of conventional fiber forming materials, such as $\epsilon$-lactams, nylon salts (diammonium dicarbonates), $\epsilon$-amino acids and the like.

As described above, the polyamide 30303T and polyamide 30403of the present invention can be obtained by polymerizing a salt (or a mixture containing substantially equimolar amounts) of 1,3-bis($\gamma$-aminopropoxy)-propane or 1,4-bis($\gamma$-aminopropoxy) butane with terephthalic acid alone or in admixture with a small amount of the second component by heating. However, when these polyamide forming materials are merely polymized by heating under elevated pressure, atmospheric pressure or reduced pressure, polyamides having high polymerization degree cannot be obtained in most cases. This tendency is lowest in the polymerization of polyamide 30403T.

It has been commonly known that when a salt of diamine with dicarboxylic acid is merely polymerized under atmospheric pressure or reduced pressure in a conventional manner, the balance between the dicarboxylic acid and the diamine is lost due to volatilization of the diamine, and consequently it is difficult to increase the polymerization degree. It has been also well known to effect a polymerization under pressure in the initial stage of polymerization in order to suppress the volatilization of the diamine. However, the polyamide of the present invention, even when produced by a polymerization under pressure, is liable to be coloured and it is hard to increase the polymerization degree probably due to the reason that the polyamide contains ether linkages in the recurring structural unit. Therefore, it has hitherto been considered to be fairly difficult to produce polyetheramide in a commercial scale.

The inventors have found that polyamide 30303T and polyamide 30403T having a high polymerization degree and a high whiteness can be obtained by adding a small amount of a phosphorous acid ester into the polymerization system.

The phosphorous acid ester means alkyl, aryl and alkylaryl esters of phosphorous acid and includes monoester, diester and triester. However, phosphorous acid monoester is generally unstable and is somewhat difficult to handle, and the phosphorous acid diester and triester are used most advantageously. The commonly used alkyl groups are straight chain alkyl groups, such as methyl, ethyl, propyl, butyl, pentyl, cetyl, octyl, nonyl, lauryl, oleyl, stearyl groups and the like. As the aryl group, the phenyl group is commonly used. As the alkylaryl group, methylphenyl and nonylphenyl groups are commonly used. As the most commonly used phosphorous acid ester, mention may be made of, for example, dimethyl phosphite, trimethyl phosphite, diethyl phosphite, triethyl phosphite, dibutyl phosphite, tributyl phosphite, diphenyl phosphite, triphenyl phosphite and the like. Metal salts, such as sodium, potassium calcium, magnesium and manganese salts, of the above described monoesters or diesters may be also used.

The addition of these phosphorous acid esters to the polymerization system of polyetheramide is carried out by previously mixing the ester with the starting material for polymerization or by adding the ester during the polymerization reaction. The addition amount is 0.001 – 5.0 percent by weight, preferably 0.01 – 1.0 percent by weight, most preferably 0.05 – 0.5 percent by weight, based on the polyamide. When the phosphorous acid ester is not added, it is very difficult to obtain the abovementioned polyether terephthalamide having an intrinsic viscosity higher than 0.7, however, when 0.3 percent of diphenyl phosphite or triphenyl phosphite is added, it is easy to obtain the polyether terephthalamide having an intrinsic viscosity higher than 0.7.

When substantial homopolymer of polyamide 30303T or polyamide 30403T having a sufficiently high polymerization degree, for example, one having an intrinsic viscosity of at least 0.7, preferably at least 0.8, in m-cresol at 30°C, is melt spun and, if necessary, drawn in a conventional manner, an excellent fiber can be easily obtained. The thus obtained fiber according to the present invention has a remarkably high crystallinity and further generally has a modulus (initial modulus) of at least 15 g/d, in most cases at least 30 g/d. Conventional nylon-6 or nylon-66 drawn filaments generally have a modulus of 20 – 40 g/d, but when the drawn filaments are shrunk in water at 100°C under no load, the modulus decreases to about 10 g/d. On the contrary, the fiber according to the present invention, even after such shrinking treatment in boiling water, generally has a modulus of at least 20 g/d. Therefore, the fiber according to the present invention is satisfactorily highly elastic even after dyeing and finishing steps.

When melted polyamide 30303T and polyamide 30403T are quenched, transparent solids are formed, while when these melted polyamides are cooled gradually, the polyamides are crystallized to form milk-white solids. As polyamide 30303T or polyamide 30403T is molecularly oriented by drawing after melt spinning by a conventional manner, the double refraction index increases, and when the value is at least 0.07, particularly at least 0.08, the polyamide has a high modulus. Conventional drawn nylon-6 or nylon-66 has a double refraction index of 0.05 – 0.06, while the fiber according to the present invention has a fairly higher double refraction index than that of the conventional polyamide fibers. This high double refraction index influences favorably the reflection property of the fiber, and the fiber according to the present invention has more excellent silk-like gloss than the conventional aliphatic polyamide fibers.

When molten polyamide 30203T, as a control, is compared with polyamide 30303T and polyamide 30403T, according to the invention, as regards heat stability, it is found that the intrinsic viscosity of polyamide 30203T is reduced about 50 percent or more within about 30 minutes, whereas the intrinsic viscosity of polyamide 30303T is reduced less than about 15 percent and the intrinsic viscosity of polyamide 30403T is reduced less than about 10 percent, during the same period. As a consequence, filaments made by melt spinning polyamide 30303T and 30403T possess superior properties even though the polyamides have been held in a molten condition for an extended period of time prior to spinning.

As described above, the fiber according to the present invention is obtained by melt spinning polyamide 30303T or polyamide 30403T, and drawing the spun filaments so that the double refraction index may be at least 0.07. For this purpose, the draw ratio is preferred to be somewhat higher than that in the drawing of conventional nylon-6, nylon-66 and the like. For example, in the drawing of nylon-6, nylon-66 or the like, undrawn filaments obtained by extruding into air through orifices having a diameter of about 0.25 mm, cooling and taken up at a rate of about 600 m/min are generally drawn to 3.4 – 4.4 times their original length in the drawing step. On the other hand, in the drawing of polyamide 30303T and polyamide 30403T, undrawn filaments obtained in the same manner as described above must be drawn to about 3.6 – 6.0 times their original length in order to obtain fibers having a double refraction index of at least 0.07 and a high modulus.

When polyamide 30303T or polyamide 30403T is melt spun merely in a conventional manner, cooled and taken up, the wound undrawn filaments mutually adhere, and the unwinding of the undrawn filaments is often difficult. This sticking phenomenon seldom occurs in the other homopolyterephthalamides. Excellent fibers cannot be obtained without solving this sticking phenomenon.

According to the present invention, stickiness of fibers is prevented by the following four methods.

In the first method for preventing the stickiness, polyamide 30303T or polyamide 30403T is mixed with a small amount of a polymethylene compound, and the resulting mixture is spun. The polyethylene compound includes compounds having long polymethylene groups (at least 8 carbon atoms) in the molecular chain, for example, polyethylene, polyethylene copolymer, paraffin, nylon-11, nylon-12, nylon-610, nylon-612, etc. These polymethylene compounds are preferably mixed in amounts less than 5 percent by weight, preferably 0.1 – 3 percent by weight, and most preferably 0.5 – 1.5 percent by weight, based on the polyamide. The mixing may be effected by a conventional mechanical stirring, for example, by means of a screw extruder. The polymethylene compounds may be added during the polymerization or to the starting materials for polymerization. However, since polyamides, such as nylon-11 and the like, are apt to copolymerize, mixing prior to the polymerization step is not suitable.

In the second method, after the spinning, the drawing is carried out without winding up, because drawn polyamide 30303T and polyamide 30403T exhibit no stickiness.

In the third method, the polyamide fiber (undrawn filament) is crystallized as much as possible before taking up. That is, the coagulated polyamide fiber is heated up to a temperature at which the crystallization is accelerated. For example, a good result is obtained by maintaining the cooling gas (usually air, nitrogen or steam) in the spinning step at a relatively high temperature, that is, by passing the filament, just after it is extruded through the orifice, through a cooling zone kept at a temperature $T_1$ shown by the following formula II.

$$30 + 5n \leq T_1 (°C) \leq 200 - 5n \quad (II)$$

In the above formula II, $n$ is 3 for a substantial homopolymer of polyamide 30303T, and $n$ is 4 for a substantial homopolymer of polyamide 30403T.

The most preferable result is obtained within the temperature range, which is at least 10°C higher than the lower limit of $T_1$ shown in the above described formula II and at least 30°C lower than the upper limit of $T_1$.

The inventors have investigated by means of differential thermal analysis with respect to the temperature $T_2$ of crystallization (exothermic peak) when melted polyamide 30303T or polyamide 30403T is cooled and solidified, and the temperature $T_3$ of crystallization (exothermic peak) when the non-crystalline polymer obtained by quenching and solidifying each melted polyamide is heated, and the results as shown in the following Table 1 were obtained.

Table 1

| Polyamide | $T_2$: temperature of crystallation when melted polyamide is cooled (°C) | $T_3$: temperature of crystallation when quenched product is heated (°C) |
|---|---|---|
| 30303T | 210 – 180 | 60 – 100 |
| 30403T | 200 – 185 | 70 – 105 |

Consequently, the temperature which accelerates the crystallization of each polyamide lies within the temperature range shown by $T_4$ of the following formula III, and the temperature which accelerates most effectively the crystallization lies within the temperature range which is at least 10°C lower than the upper limit of $T_4$ shown by the formula III and is at least 20°C higher than the lower limit of $T_4$.

$$30 + 10n \leq T_4(°C) \leq 240 - 10n \quad (III)$$

In the above formula III, $n$ is 3 for a substantial homopolymer of polyamide 30303T, and $n$ is 4 for a substantial homopolymer of polyamide 30403T.

In order to obtain undrawn filaments having low stickiness, it is preferable to cool each melt spun polyamide to room temperature while passing the melt spun polyamide through a zone kept at the temperature range shown by $T_4$ of the formula III for a period of time as long as possible (for example, at least 0.05 second). This object can be attained by passing the melt spun polyamide through a cooling gas or a cooling zone kept at the temperature range shown by the above-mentioned formula II (in general, the temperature of cooling gas or cooling zone is always fairly lower than that of spun filament).

In the third method, polyamide fiber (undrawn filament) once cooled is heated again up to a temperature shown by the formula III before the fiber is taken up. This heating may be effected, for example, by running the fiber through a heated gas or by contacting the fiber with a metal heater, etc.

The fourth method is a combination of the above described methods.

Among these methods, the first method and the third method and the combination thereof are remarkably effective and useful because, in these methods, stickiness of fibers can be prevented by means of a commonly used apparatus and no special apparatus is required.

As the other method for preventing stickiness of fibers, there has been used a method in which oiling after spinning is effected by means of a non-aqueous oil composition using solvents, such as hydrocarbons, ketones, alcohols, ethers and chlorinated hydrocarbons, or of an oil composition containing a very small amount of water. However, in this method, the undrawn filament taken up on a bobbin is liable to be loose.

The fiber according to the present invention has an excellent modulus and gloss as described above, and further has an excellent antistatic property.

Conventional polyamide fibers are charged readily to a high voltage due to friction. In order to improve this drawback, modified polyamides, such as copolyamides or blended polyamides containing a second component having an antistatic property have hitherto been proposed. However, these modified polyamides, particularly copolyamides, are often poor in dynamic property, heat resistance and light resistance. Further, modified polyamides, in which a modifier having an antistatic property is mixed with or adhered to the polyamide, have no permanent antistatic property because the modifier (in most cases, this modifier is a compound having hydrophilic property or surface active property), is lost readily by washing with water and others.

On the contrary, the fiber according to the present invention has an excellent antistatic property, although the fiber is a substantial homopolymer. For example, when a fiber composed of a homopolyamide of polyamide 30303T or polyamide 30403T which has previously been washed with water thoroughly to remove oil, is run at a velocity of 100 m/min. and contacted with alumina ceramic having a diameter of 1 cm 4 times at an angle of 90° (in total 360°) under a tension of 0.5 g/d, the charged voltage of the fiber is about 100 – 150V, and this charged voltage is discharged and disappears in a relatively short time, for example, within 10 minutes. On the contrary, the charged voltage of a nylon-6 or nylon-66 fiber determined by the above described method is about 800 – 1,500V, which is considerably higher than that of the fiber of the present invention, and is discharged very slowly. In the previously proposed highly elastic polyamide fiber, for example, in the poly-amide fiber prepared from bis(para-aminocyclohexyl)methane and a higher dicarboxylic acid, the charged voltage determined by the above described method is negative and is −800 to −1,500V. In the fiber composed of polyundecamethylene terephthalamide (11T) or its copolyamide, the charged voltage is highly negative and is about −1,000V.

The antistatic property of the fiber according to the present invention is inherent to the fiber itself. Consequently, the antistatic property is not lost by washing and other treatments, and no modifier is required in order to give antistatic property to the fiber. Therefore, the dynamic property and other properties of the fiber are not deteriorated. There have hitherto been known some polymers having an antistatic property, such as polyethylene glycol, etc., but many of them do not have a dynamic property sufficient to be used practically as a fiber, and consequently they are used as a modifier or an additive. The fiber according to the present invention is substantially composed of homopolyamide and has an excellent antistatic property in itself and further has practically satisfactory spinnability, heat stability, modulus, strength, elongation and dyeability, and such an excellent fiber has never been known. (It has already been explained in detail in this specification that the fiber of the present invention is particularly excellent in elastic property.)

Of course, the polyamide according to the present invention of fibers prepared therefrom may be mixed with or copolymerized with a second component in order to improve further the antistatic property. For example, a small amount of polyethylene glycol derivatives can be mixed with the polyamide or can be copolymerized with the polyamide to form a block copolymer. Even in such a case, since the polyamide of the present invention has a fairly excellent antistatic property in itself, the amount of antistatic agent to be mixed or copolymerized can be decreased as compared with the case of conventional polyamides, and consequently the various excellent properties of the polyamide are not lost.

As described above, the fiber prepared by spinning and drawing a substantial homopolymer of polyamide 30303T or polyamide 30403T has various excellent properties. However, the inventors have further made various investigations in order to improve the properties, particularly, the elastic property, of the fiber, and found that a fiber having a more improved modulus can be obtained by drawing spun filaments under a limited condition and further subjecting the drawn filaments to a heat treatment under a limited condition.

That is, when spun undrawn filaments are drawn at a temperature between the range shown by $T_5$ of the following formula IV, and the resulting drawn filaments are successively subjected to a heat treatment under tension at a temperature between the range shown by $T_6$ of the following formula V, a fiber having an improved strength and modulus can be obtained.

$$50 \leq T_5(°C) \leq 160 - 10n \text{ (IV) and}$$

$$100 \leq T_6(°C) \leq 230 - 15n \text{ (V)}$$

In the above formulae IV and V, $n$ is 3 for a substantial homopolymer of polyamide 30303T, and $n$ is 4 for a substantial homopolymer of polyamide 30403T.

The most preferable result is obtained when the drawing is effected within a temperature range, which is at least 10°C higher than the lower limit and is at least 10°C lower than the upper limit of the temperature range shown by $T_5$ of the formula IV, and further the heat treatment under tension is effected within a temperature range, which is at least 10°C higher than the lower limit and at least 10°C lower than the upper limit of the temperature range shown by $T_6$ of the formula V.

In the present invention, undrawn filaments can be hot drawn similarly to the hot drawing of conventional undrawn filaments. For example, the drawing is effected while heating the undrawn filaments by means of a hot pin, a hot plate or a hot roller. When the drawing temperature is lower than the temperature range shown by $T_5$ of the formula IV, yarn breakage is apt to occur in the drawing, while the drawing temperature is higher than the temperature range shown by $T_5$, the strength and modulus of the drawn filaments are lowered, and consequently a drawing temperature outside of the above range is not preferable. The draw ratio depends upon the spinning condition, and is usually 3.5 − 8 times, preferably 4.0 − 6.0 times. Within this range, yarn breakage hardly occurs in the drawing, and excellent drawn filaments having a tensile strength of at least 3 g/d, usually 4 − 6 g/d, an elongation of 20 − 40 percent and an initial modulus of 25 − 80 g/d can be obtained.

After the undrawn filaments composed of substantial homopolymer of polyamide 30303T or polyamide 30403T have been drawn by the above described method, the resulting drawn filaments are subjected to a heat treatment under tension. This heat treatment under tension may be effected in a conventional method which is commonly used for heat treating drawn filaments under tension. For example, any method capable of heat treating drawn filaments under tension by a hot plate, a hot roller, a hot tube or hot air can be used in the present invention.

In the present invention, when the drawn filaments are heat treated under tension at an extension ratio, i.e., at a ratio of delivery velocity/feed velocity of 0.95 − 1.20, particularly 0.97 − 1.15, a preferable result is obtained. Within the above-mentioned range, as the extension ratio is higher, the modulus of the treated filaments is higher. However, when the extension ratio is less than 0.95, the modulus of the treated filaments is considerably decreased, while when the extension ratio is more than 1.20, yarn breakage is apt to occur and the elongation of the treated filaments is decreased.

In the above-mentioned heat treatment under tension, when the treating time is at least 0.05 second, particularly at least 0.5 second, a preferable result is obtained. When the temperature in the heat treatment under tension is lower than that shown by $T_6$ of the formula V, further improvement of the modulus of the drawn filaments is hardly possible, while the temperature is higher than that shown by $T_6$, the strength and the modulus are decreased. Furthermore, when the treating time is too short, the drawn filaments cannot sufficiently be heat treated under tension, and the object of the present invention cannot be attained.

The polyether terephthalamide fiber according to the present invention subjected to the above described heat treatment under tension has extremely higher modulus than the conventional polyamide fibers, such as nylon-6 fiber, and can be used in a field in which conventional polyamide fibers have not been used.

The present invention further consists in a composite filament obtained by extruding a plurality of spinning materials through a common orifice to form a unitary filament in which the plurality of spinning materials are uniformly bonded along the longitudinal direction, which is characterized in that at least one of said plurality of spinning materials is a substantial homopolymer of polyamide 30303T or polyamide 30403T.

As the bonding type, conventional bonding types, for example, a side-by-side relation as shown in FIG. 1 and a sheath-core relation as shown in FIGS. 2 − 6, may be used. Furthermore, the composite filament of the present invention includes a multi-layer filament composed of a large number of layers extending continuously along the longitudinal direction in the unitary filament, for example, one in which a plurality of components are bonded radially in the cross-section as shown in FIG. 7; one in which a plurality of components are arranged one upon another in the form of thin grainy layers in the cross-section as shown in FIG. 8; one in which one component is dispersed in the other component in the cross-section as shown in FIG. 9 (archipellagic condiguration), as if islands are dispersed in the ocean; one in which one component is dispersed in the other component in the cross-section as shown in FIG. 11 (nebulous configuration), as if stars are dispersed in the sky; one in which a plurality of components are bonded in the form of a mosaic as shown in FIG. 10 and others. The above described polyether terephthalamide can be used as one component of these composite filaments having an optical bonding type.

In the composite filament of the present invention, the spinning material to be used in combination with the above mentioned polyether terephthalamide includes conventional spinning materials capable of melt spinning; for example, homopolymers, copolymers and polymer blends of conventional polyamide, polyester, polyether, polycarbonate, polyolefin and the like. As the polyamide, mention may be made of aliphatic polyamides, such as nylon-4, nylon-6, nylon-66 and nylon-610, aromatic or cycloaliphatic polyamides, such as polymetaxylylene adipamide (MXD-6), polyparaxylylene decanamide (PXD-12) and poly-bis(cyclohexane)methane decanamide (PACM-12), and copolyamides thereof. As the polyester, mention may be made of aromatic polyesters, such as polyethylene terephthalate, polyethylene oxybenzoate, polytetramethylene terephthalate, and polydimethylcyclohexane terephthalate, and copolyesters thereof.

By using the above-mentioned polyether terephthalamide as one component, a composite filament having an improved elastic property and antistatic property can be obtained. Consequently, the polyether terephthalamide is preferred to occupy at least a part, preferably the whole part, of the surface of the composite filament. A preferred composite filament is one in which the polyether terephthalamide is used as a sheath and another polymer, for example, another polyamide, polyester or polyolefin, is used as a core. Such a composite filament has excellent flexural rigidity, even when any polymer is used as a core, because the polyether terephthalamide has an excellent elastic property. However, aromatic polyamide or aromatic polyester is preferably used as a core polymer in order to further improve the flexural rigidity.

In the sheath-core composite filament of the present invention, the number of cores may be single or plural as shown in FIG. 4, and the shape of the cores may be circular or non-circular as shown in FIG. 5. The core and sheath may be arranged in an eccentric relation as shown in FIG. 3, or in a concentric relation as shown in FIGS. 2, 4 and 6. When the core and the sheath are arranged in an eccentric relation, the composite filament has a spontaneous crimpability. The conjugate ratio of core to sheath may be selected optionally depending upon the purpose, and a ratio of 10/1 – 1/10 (by weight), particularly 3/1 – 1/3, is commonly used. When the core polymer has higher modulus than sheath polymer, as the weight of core is larger, the flexural rigidity of the filament is higher, and moreover filaments having a non-circular core have a higher flexural rigidity than those having a circular core.

As described above, composite filaments having a desired modulus and flexural rigidity can be obtained by selecting optionally the kind of core polymer, cross-sectional shape of filament, number and shape of cores, and conjugate ratio of core to sheath. However, when the above described polyether terephthalamide is not used as a sheath polymer, sheath-core composite filaments having an improved modulus, flexural rigidity, antistatic property and dyeability cannot be obtained.

Similarly, multi-layer filaments wherein components other than the above-described polyether terephthalamide is dispersed in the polyether terephthalamide in the form of islands in the ocean (FIG. 9) or stars in the sky (FIG. 11) in the cross-section of the unitary filament, are preferable.

In the filaments according to the present invention, that is, in the filaments composed of substantial homopolymer of polyamide 30303T or polyamide 30403T, or in the composite filaments (including multi-layer filament) containing these polyether terephthalamides as one component, the cross-sectional shape (profile) may be circular or non-circular as shown in FIG. 6. Filaments having a non-circular cross-section can be spun through commonly known non-circular orifices, for example, Y-shaped, T-shaped or H-shaped orifices. When, for example, a combination of polyamide and polyether is spun, multi-layer filaments having a non-circular cross-section, particularly ones having a grainy cross-sectional configuration, may be obtained by using circular orifices. The fiber (including composite filament) according to the present invention can be used in the form of continuous filament or cut into staple fibers, and made into yarn, knitted goods, woven fabrics, web, leather-like material and the like in the form of continuous filament or staple fibers. Moreover, the fiber of the present invention can be doubled, mix spun, knitted and woven together with other commonly known fibers to produce excellent fibrous articles.

For a better understanding of the invention, reference is taken to the accompanying drawings, wherein.

Figure 1:
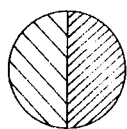
FIG. 1 is a cross-sectional view of a side-by-side composite filament.

The following examples are given in illustration of this invention and are not intended as limitations thereof.

In the examples, the intrinsic viscosity of the polyamide was determined in m-cresol at 30°C, and that of the polyester was determined in o-chlorophenol at 30°C.

The tensile strength, elongation and initial modulus of fiber were determined in the following manner. A sample fiber having a length of 5 cm is stretched at a rate of 2.5 m/min at 25°C in an atmosphere of 65 percent RH by means of an Instron universal tensile tester.

The charged voltage due to friction of fiber was determined in the following manner. A fiber is washed with an aqueous solution of a neutral detergent at 100°C for 3 hours, washed with water thoroughly and dried, and the dried fiber is left to stand for 3 hours in atmosphere kept at 25°C and at a humidity for 65 percent. Then, the fiber is run at a velocity of 100 m/min and contacted with an alumina ceramic having a diameter of 8 mm four times at an angle of 90° (in total 360°), and the charged voltage due to friction generated in the fiber is determined by means of a vibration capacity type detector.

In the following examples, nylon salts of an etherdiamine with terephthalic acid are abridged as described in the following Table 2.

Table 2

| | | |
|---|---|---|
| 30203T salt | : | salt of 1,2-bis(γ-aminopropoxy)ethane with terephthalic acid |
| 30303T salt | : | salt of 1,3-bis(γ-aminopropoxy)propane with terephthalic acid |
| 30403T salt | : | salt of 1,4-bis(γ-aminopropoxy)butane with terephthalic acid |
| 30603T salt | : | salt of 1,6-bis(γ-aminopropoxy)hexane with terephthalic acid |
| 303T salt | : | salt of bis(γ-aminopropyl)ether with terephthalic acid |
| 303'03T salt | : | salt of 1-methyl-1,2-bis(γ-aminopropoxy)ethane with terephthalic acid |

Example 1

This example 1 explains the fundamental property or polyether terephthalamides prepared from various nylon salts as shown in the above Table 2.

A 30203T salt was heated and melted under nitrogen atmosphere (atmospheric pressure) in an autoclave and polymerized at 230°C for 2 hours, and then heated up to 265°C in 30 minutes, and further polymerized for 2 hours under a reduced pressure of 10 mmHg to obtain a polyamide 30203T.

A 30303T salt was polymerized in substantially the same manner as in the case of polyamide 30203T, except that the polymerization under reduced pressure was effected at 250°C, to obtain a polyamide 30303T.

A 30403T salt was polymerized in the same manner as in the case of the polyamide 30303T to obtain a polyamide 30403T.

In the same manner, a polyamide 30603T and a polyamide 303'03T were prepared from a 30603T salt and a 303'03T salt, respectively.

A 303T salt ws polymerized in substantially the same manner as in the case of the polyamide 30203T, except that the polymerization under atmospheric pressure was effected at 265°C and the polymerization under reduced pressure was effected at 290°C for 40 minutes, to obtain a polyamide 303T.

The intrinsic viscosity and melting point of the resulting polyamides and the appearance of their gradually cooled products are shown in the following Table 3.

Table 3

| Polyamide | Intrinsic viscosity $[\eta]$ | Melting point (°C) | Appearance of gradually cooled product |
|---|---|---|---|
| 303T | 0.71 | 284 | light yellow, transparent |
| 30203T | 0.69 | 245 | light yellowish white, opaque |
| 30303T | 0.71 | 227 | light yellowish white, opaque |

Table 3-Continued

| Polyamide | Intrinsic viscosity $[\eta]$ | Melting point (°C) | Appearance of gradually cooled product |
|---|---|---|---|
| 303'03T | 0.64 | 198 | light yellow, opaque |
| 30403T | 0.81 | 222 | milk-white, opaque |
| 30603T | 0.75 | 200 | milk-white, opaque |

The polyamide 30203T, polyamide 30303T, polyamide 30403T and polyamide 30603T have high crystallinity, and their gradually cooled products are opaque. While, the polyamide 303T and polyamide 303'03 have low crystallinity. Moreover, among the polyamides obtained by the above-mentioned polymerization, only the polyamide 30403T and polyamide 30603T are relatively stable and have a high intrinisic viscosity, polymerization degree and whiteness. However, when a mixture of the 30203T salt or 30303T salt with 0.2 percent of triphenyl phosphite was polymerized in the same manner, a polyamide 30203T or a polyamide 30303T having a high whiteness and an intrinsic viscosity of 0.84 and 0.88, respectively, was obtained.

A differential thermal analysis was effected with respect to quenched products, gradually cooled products, and drawn and oriented fiber of the preferred polyamide 30303T and polyamide 30403T, which had a whiteness, polymerization degree, crystallinity and melting point higher than the other polyamides. Typical differential thermal analysis curves of these polyamides are shown in FIG. 12.

Figure 12:
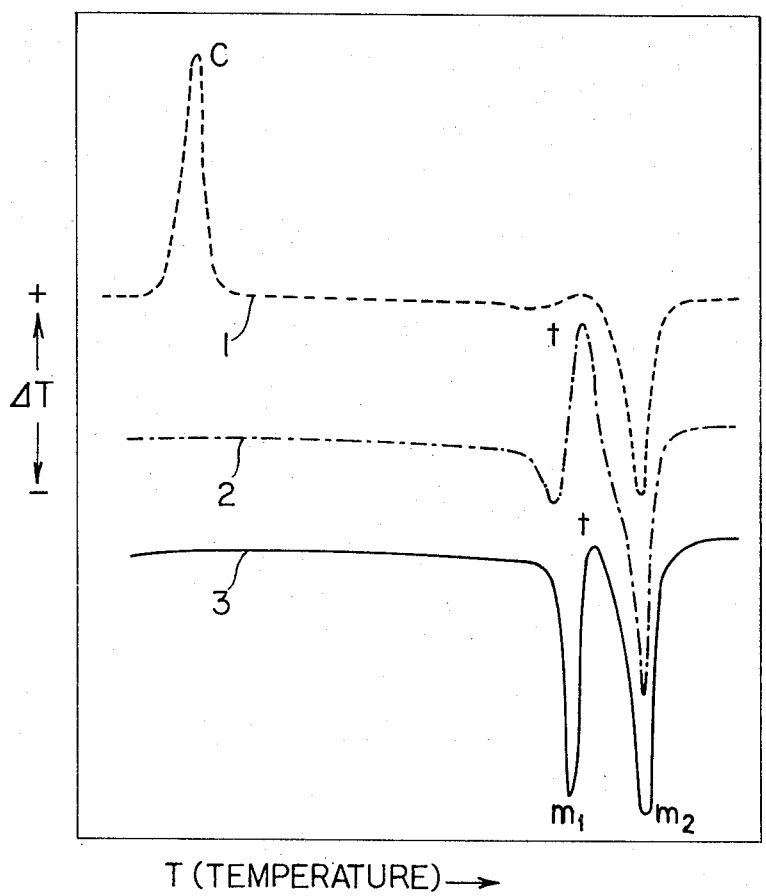
FIG. 12 shows differential thermal analysis curves of polyether terephthalamides according to the present invention.

In FIG. 12, a dotted line 1 is a differential thermal analysis curve of a quenched product (cooled undrawn filaments by exposing to a cold air at 20°C just after spinning), a dot-dash-line 2 is that of a gradually cooled product (unoriented) and a solid line 3 is that of a drawn filament obtained by drawing a quenched product. The characteristic of the differential thermal analysis curve 1 of the quenched product is an exothermic peak C by crystallization which appears in a relatively low temperature zone. In the quenched products of commonly used polyamides, such as nylon-6 and nylon-66, crystallization has already been proceeded fairly, and such phenomenon does not appear. While, when polyamide 30303T and polyamide 30403T are quenched, transparent non-crystalline products are obtained, and it seems that this phenomenon is the reason why the wound filaments after being melt spun and quenched are apt to stick. In the differential thermal analysis curve 2 of the gradually cooled product, no exothermic peak due to crystallization appears. In the differential thermal analysis curve 3 of the drawn filaments no exothermic peak appears similarly. In the above described curves 1, 2 and 3, large endothermic peaks m appearing in relatively high temperature zone show the melting point (melting point of crystal). There are two distinct endothermic peaks $m_1$ and $m_2$ in the differential thermal analysis curve 3 of the drawn filaments. Particularly, in the differential thermal analysis curve 2 of the gradually cooled product, an exothermic peak $t$ appears distinctly between the endothermic peaks $m_1$ and $m_2$, and this exothermic peak $t$ is probably due to the transition of the crystal. Moreover, in the differential thermal analysis curve 2 of gradually cooled product, a distinct endothermic peak $m_1$ appears. In the differential thermal analysis curve 1 of the quenched product, the endothermic peak $m_1$ is indistinct. These facts show that the crystal structure of the drawn and oriented filaments shown by the differential thermal analysis curve 3 is fairly different from that of the gradually cooled product or that of crystallized product obtained by heating the quenched product. The inventors have found that polyundecamethylene terephthalamide (11T), polynonamethylene terephthalamide (9T), polyparaxylylene decanamide (PXD-12) and copolyamides consisting mainly of these polyamides have at least two distinct endothermic peaks in the vicinity of the melting point as shown in the differential thermal analysis curve 3 shown by the solid line in FIG. 12. The reason for this phenomenon is not clear, but is probably due to the coexistence of at least two crystal structures having different melting points in the polyamide or transition of crystal. In any case, polyether terephthalamide drawn filaments constituting the fiber of the present invention are different from conventional aliphatic polyamides in their behavior by heat.

The peaks C, $t$, $m_1$ and $m_2$ in the differential thermal analysis curves of polyamide 30303T and polyamide 30403T are shown in Table 4. Of course, these temperatures vary somewhat depending upon the measuring condition and hysteresis of the polyamide, and Table 4 shows their average values.

Table 4

| Polyamide | | (C) °C | $(m_1)$ °C | $(t)$ °C | $(m_2)$ °C |
|---|---|---|---|---|---|
| 30303T | quenched product | 70–100 | — | 200 | 220 |
| | gradually cooled product | — | 200 | 209 | 227 |
| | drawn filaments | — | 204 | 210 | 227 |
| 30403T | quenched product | 80–100 | — | 200 | 222 |
| | gradualy cooled product | — | 198 | 204 | 222 |
| | drawn filaments | — | 202 | 206 | 222 |

Example 2

An aqueous solution consisting of 100 parts by weight of a 30403T salt and 50 parts by weight of water was fed into an autoclave without or together with an additive, such as triphenyl phosphite, a mixture of copper acetate and potassium iodide, or manganese oxalate. After air in the autoclave was purged with nitrogen, the 30403T salt was polymerized at 200°C for 2 hours under a pressure of 16 Kg/cm², heated up to 245°C in 2 hours while releasing the pressure, and further polymerized at this temperature for 2 hours under a reduced pressure of 10 mmHg to obtain a polyamide 30403T.

While, an aqueous solution of the 30403T salt added with or not added with triphenyl phosphite was polymerized at 245°C under nitrogen atmosphere firstly for 4 hours under atmospheric pressure and further polymerized for 2 hours under a reduced pressure of 10 mmHg to obtain a polyamide 30403T.

The colour tone and intrinsic viscosity of the resulting polyamides are shown in the following Table 5.

Table 5

Effect of additives in the polymerization for polyamide 30403T

| Additive Kind | Amount (% by weight) | Polymerization condition | Colour tone of polyamide | $[\eta]$ |
|---|---|---|---|---|
| No addition | 0 | under superatmospheric pressure and reduced pressure | yellow | 0.45 |
| Triphenyl phosphite | 0.1 | do. | white | 2.4 |
| Copper acetate + potassium iodide | 0.005 0.005 | do. | yellow | 0.51 |
| Copper acetate + potassium iodide | 0.02 0.02 | do. | light brown | 0.48 |
| Manganese oxalate | 0.005 | do. | yellow | 0.42 |
| No addition | 0 | atmospheric pressure and reduced pressure | white | 0.69 |
| Triphenyl phosphite | 0.1 | do. | white | 1.6 |

As seen from Table 5, the effect of phosphorous acid ester is remarkable. That is, polyamides prepared by adding phosphorous acid ester have high whiteness and polymerization degree. Among the polyamides of the present invention, ones having an intrinsic viscosity of 0.7 – 1.6 are generally suitable for producing filaments. In order to produce polyamides having such an intrinsic viscosity, suitable conventional viscosity regulators (polymerization inhibitor), such as diamine, monoamine, dicarboxylic acid, monocarboxylic acid, can be used together with the phosphorous acid ester of the present invention. However, when the polymerization is not effected according to the method of the present invention (that is, when the phosphorous acid ester is not added), even if the polymerization inhibitor is not used, the intrinsic viscosity of the resulting polyamide is at most about 0.7 in many cases.

Example 3

This example 3 explains the properties of the fibers according to the present invention.

A polyamide 30303T having an intrinsic viscosity of 0.88, which was obtained by polymerizing a 30303T salt together with 1 percent by weight based on the nylon salt of a modified polyethylene having a molecular weight of about 2,000 and an acid value of 15 as an antisticking agent, was melt spun by means of an extruder. That is, the melted polyamide 30303T was extruded through orifices having a diameter of 0.25 mm at 280°C, cooled in air, and taken up at a rate of 600 m/min afer oiling, and the undrawn filaments were drawn to 4 times their original length on a draw pin at 80°C to obtain drawn filaments $Y_2$ of d/18 f. A polyamide 30403T having an intrinsic viscosity of 0.84 and containing about 1 percent of the modified polyethylene were spun and drawn in substantially the same manner as in the case of the filaments $Y_2$ to obtain drawn filament $Y_3$. The filament $Y_3$ was drawn at a temperature of draw pin of 60°C.

As a control, nylon-6 having an intrinsic viscosity of 1.13 was spun and drawn in the same manner as in the case of the filaments $Y_3$, except that the draw ratio was 3.7 times, to obtain drawn filaments $Y_4$.

Each of drawn filaments was boiled in water at 100°C for 10 minutes under a relaxed state (in this boiling, the filament shrinks about 12 percent), and then the boiled filament was dried.

The initial modulus of each drawn filament and the boiled filament, and the tensile strength and elongation of each drawn filament are shown in the following Table 6.

Table 6

| Filament | | Initial modulus (g/d) | | Tensile strength (g/d) | Elongation (%) |
|---|---|---|---|---|---|
| | | Drawn filament | Boiled filament | | |
| $Y_2$ | (30303T) | 40.6 | 24.0 | 4.01 | 28.8 |
| $Y_3$ | (30403T) | 38.3 | 22.2 | 4.23 | 26.2 |
| $Y_4$ | (nylon-6) | 21.1 | 12.0 | 4.89 | 35.5 |

As seen from Table 6, the filaments $Y_2$, $Y_3$ according to the present invention have a high initial modulus even after boiling.

The double refraction index and charged voltage due to friction of each filament are shown in the following Table 7, which shows that the fiber according to the present invention has high double refraction index and the charged voltage due to friction of the fiber is low.

Table 7

| Filament | | Double refraction index ($\Delta n$) | | Charged voltage (V) |
|---|---|---|---|---|
| | | Drawn filament | Boiled filament | |
| $Y_2$ | (30303T) | 0.108 | 0.096 | 450 |
| $Y_3$ | (30403T) | 0.106 | 0.094 | 150 |
| $Y_4$ | (nylon-6) | 0.054 | 0.049 | 1200 |

The cloths made of the filaments $Y_2$, $Y_3$ were superior to the cloths made of the filament $Y_4$ in bulkiness and initial modulus, and further had an excellent silk-like gloss. This excellent gloss is probably due to the high double refraction index, that is, due to the fact that the reflection index varies depending upon the direction of light. (There is a certain relation between double refraction index and reflection index.)

Example 4

This Example 4 explains the properties of the filament with respect to the drawing and heat treatment of polyamide 30403T.

Polyamide 30403T having an intrinsic viscosity of 0.71 and containing 1.0 percent by weight of modified polyethylene was melt spun through orifices having a diameter of 0.30 mm at a spinning temperature of 280°C by means of a screw extruder, cooled in air and taken up at a take-up rate of 585 m/min after oiling, and the resulting undrawn filaments were drawn at a draw ratio of 4.67 times on a draw pin kept at a temperature of 25°C, 40°C, 50°C, 60°C, 70°C, 100°C, 110°C, 120°C or 130°C to obtain 9 kinds of drawn filaments of 70 d/18f.

The relationships between drawing temperature and yarn properties, such as the drawability, tensile strength, elongation and initial modulus, were examined to obtain the results as shown in the following Table 8.

Table 8

| Drawing temperature (°C) | Drawability | Tensile strength (g/d) | Elongation (%) | Initial modulus (g/d) |
|---|---|---|---|---|
| 25 | yarn breakage occurs very often. | 3.26 | 33.5 | 35.0 |
| 40 | yarn breakage occurs. | 3.29 | 34.6 | 34.9 |
| 50 | no yarn breakage occurs | 3.33 | 34.3 | 35.1 |
| 60 | do. | 3.46 | 36.4 | 35.4 |
| 70 | do. | 3.53 | 37.8 | 35.2 |
| 100 | do. | 3.51 | 36.3 | 35.5 |
| 110 | do. | 3.52 | 35.3 | 34.7 |
| 120 | do. | 3.41 | 31.1 | 32.1 |
| 130 | yarn breakage occurs. | 3.20 | 30.3 | 30.2 |

As seen from Table 8, when drawing is effected at a temperature not higher than 40°C, the drawn filament is excellent in tensile strength and initial modulus, but yarn breakage occurs very often in the drawing.

On the other hand, when drawing is effected at a temperature between the range shown by $T_5$ ($n=4$) of the formula IV, that is, at a temperature of 50° – 120°C, the drawn filament is excellent in tensile strength and initial modulus, and moreover, no yarn breakage occurs in the drawing. Particularly, when drawing is effected at a temperature of 60° – 110°C, the drawn filament is excellent in yarn properties. However, when drawing is effected at a temperature of 130°C, the drawn filaments are low in tensile strength and initial modulus.

Next, the above described undrawn filament was drawn to 4.67 times its original length on a draw pin at 100°C to obtain a drawn filament, and the drawn filament was taken up on an aluminum bobbin without extension (extension ratio = 1.0), and subjected to a heat treatment in air kept at a temperature of 90°C, 100°C, 110°C, 120°C, 140°C, 160°C, 170°C or 180°C for 10 minutes.

Properties of the heat treated filaments are shown in the following Table 9.

Table 9

| Treating temperature (°C) | Tensile strength (g/d) | Elongation (%) | Initial modulus (g/d) |
|---|---|---|---|
| Untreated filament (before heat treatment under tension) | 3.51 | 36.3 | 35.5 |
| 90 | 3.53 | 34.7 | 35.3 |
| 100 | 3.50 | 31.8 | 35.7 |
| 110 | 3.51 | 29.7 | 40.4 |
| 120 | 3.52 | 30.0 | 45.3 |
| 140 | 3.53 | 27.6 | 43.0 |
| 160 | 3.52 | 28.3 | 40.1 |
| 170 | 3.47 | 24.8 | 37.5 |
| 180 | 3.20 | 21.1 | 33.7 |

As seen from Table 9, when heat treatment under tension is effected at a temperature between the range shown by $T_6$ ($n=4$) of the formula V, that is, at a temperature range of 100° – 170°C, the treated filament is superior in initial modulus to the untreated filament. Particularly, when the treating temperature is 110° – 160°C, the effect of heat treating is remarkable.

However, when the temperature at the heat treatment under tension is less than 100°C (90°C), the initial modulus of filament is not substantially improved, while when the temperature is higher than 170°C (190°C), the tensile strength is reduced, and the initial modulus is not improved.

Then, the above described undrawn filament was drawn to 4.67 times its original length at a temperature of 100°C, and the influences of relaxation and extension, which show the degree of tension, at the heat treatment were examined by using the above obtained drawn filament.

That is, the drawn filament was taken up on a metal frame under a condition of 10 percent relaxation, 5 percent relaxation, 3 percent relaxation, 0 percent extension, 5 percent extension, 10 percent extension, 15 percent extension or 20 percent extension, and heat treated in air at 120°C for 10 minutes to obtain 8 kinds of treated filaments. The properties of the filaments are shown in the following Table 10.

Table 10

| Degree of tension | Tensile strength (g/d) | Elongation (%) | Initial modulus (g/d) |
|---|---|---|---|
| Untreated filament (before heat treatment under tension) | 3.51 | 36.3 | 35.5 |
| 10% relaxation | 3.24 | 32.6 | 27.3 |
| 5% relaxation | 3.21 | 30.6 | 35.7 |
| 3% relaxation | 3.47 | 30.4 | 38.1 |
| 0% extension | 3.52 | 30.0 | 45.3 |
| 5% extension | 3.57 | 27.1 | 46.0 |
| 10% extension | 3.86 | 20.4 | 47.7 |
| 15% extension | 3.91 | 10.7 | 48.6 |
| 20% extension | 3.93 | 7.2 | 49.1 |

As seen from Table 10, the filament heat treated under a condition of 10 percent relaxation is inferior to the untreated filament in initial modulus. The filament heat treated under a condition ranging from 5 percent relaxation to 15 percent extension, particularly the filament heat treated under a condition ranging from 3 percent relaxation to 15 percent extension, has a high initial modulus and an excellent elongation. However, the filament heat treated under a condition of 20 percent extension has a high initial modulus, but has an excessively low elongation, and consequently the filament is not suitable to be used as commonly used fibers which require proper elongation.

Figure 13:
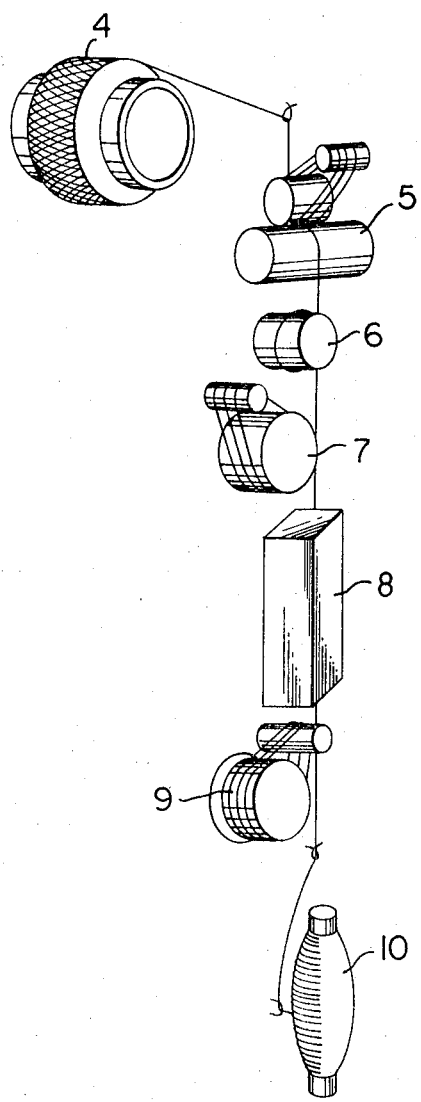
FIG. 13 is a perspective view of an apparatus for carrying out continuously the drawing and heat treatment under tension according to the present invention.

Further, the above described undrawn filament was subjected continuously to a drawing and heat treatment under tension by means of a drawing machine as shown in FIG. 13.

Referring to FIG. 13, the drawing machine is provided with a feed roller 5, a hot draw pin 6, a hot roller 7, a hot plate 8 and a delivery roller 9. Undrawn filament 4 was hot drawn on a hot draw pin 6 at a draw ratio determined by the ratio of the circumferential velocity of the feed roller 5 to that of the hot roller 7, and the drawn filament was heat treated under tension at an extension ratio determined by the ratio of the circumferential velocity of the hot roller 7 to that of the delivery roller 9 while heating the filaments 4 by the hot plate 8, and then the treated filament was continuously taken up on a pirn 10.

The above treatment was effected under the following condition; that is, draw ratio: 4.60, temperature of hot draw pin 6: 100°C, temperature of hot roller 7: 100°C, temperature of hot plate 8: 140°C (in the case of control filaments, 25°C), and extension ratio (variable): 0.97, 1.0 or 1.05.

The obtained results are shown in the following Table 11.

Table 11

| Temperature of hot plate (°C) | Extension ratio (%) | Tensile strength (g/d) | Elongation (%) | Initial modulus (g/d) |
|---|---|---|---|---|
| Room temperature (25°C, for control filament) | 1.0 | 3.50 | 36.5 | 35.2 |
| 140 | 1.0 | 3.52 | 30.4 | 42.5 |
| 140 | 0.97 | 3.43 | 33.1 | 39.1 |
| 140 | 1.05 | 3.59 | 26.2 | 44.7 |

Table 11 shows that fibers having a very high initial modulus can be obtained by the heat treatment according to the present invention.

Example 5

This Example 5 explains the properties of the filament with respect to the drawing and heat treatment of polyamide 30303T.

Polyamide 30303T having an intrinsic viscosity of 0.78 and containing 0.8 percent by weight of modified polyethylene was melt spun through orifices having a diameter of 0.25 mm at a spinning temperature of 280°C, cooled in air kept at 80°C and taken up after oiling to obtain undrawn filaments. The undrawn filaments were drawn at a draw ratio of 4.45 times on a draw pin kept at various temperatures as shown in the following Table 17. When the temperature of draw pin was not more than 40°C or not less than 140°C, yarn breakage occurred. Within the temperature range shown by $T_5$ ($n=3$) of the formula IV, that is, within the range of 50° – 130°C, drawing was easy, and the drawn filaments had excellent properties. The drawing temperature and properties of the drawn filaments are shown in the following Table 12.

Table 12

| Drawing temperature (°C) | Tensile strength (g/d) | Elongation (%) | Initial modulus (g/d) |
|---|---|---|---|
| 40 | 3.33 | 25.4 | 35.5 |
| 50 | 3.52 | 28.2 | 38.2 |
| 60 | 3.50 | 26.5 | 40.0 |
| 100 | 3.81 | 28.7 | 39.2 |
| 120 | 3.91 | 27.0 | 44.8 |
| 130 | 3.65 | 24.4 | 42.6 |
| 140 | 3.30 | 25.1 | 36.7 |

The above described undrawn filament was drawn by means of a drawing machine as shown in FIG. 13 under the following condition, that is, the ratio of circumferential velocity of the feed roller 5 to that of the hot roller 7 was 0.98, the hot draw pin 6 was not used, the ratio of circumferential velocity of the hot roller 7 (temperature: 100°C) to that of the delivery roller 9 was 4.46, and the temperature of the hot plate 8 was varied. The relationship between the temperature of the hot plate and the properties of the resulting drawn filament are shown in the following Table 13. In this process, undrawn filament is drawn on the surface of the hot roller 7 and the drawn filament is heat treated under tension with the hot plate 8 (extension ratio: 1.0).

Table 13

| Temperature of hot plate (°C) | Tensile strength (g/d) | Elongation (%) | Initial modulus (g/d) |
|---|---|---|---|
| 25 | 3.35 | 26.0 | 36.2 |
| 80 | 3.88 | 25.0 | 37.5 |
| 100 | 4.12 | 23.0 | 40.9 |
| 140 | 4.25 | 24.1 | 43.0 |
| 180 | 4.10 | 22.9 | 40.8 |
| 200 | 2.87 | 20.3 | 35.2 |

As seen from Table 13, fiber treated at a temperature between the range shown by $T_6$ ($n=3$) of the formula V, that is, at a temperature of 100° – 185°C, is excellent in tensile strength, elongation and initial modulus.

Example 6

This Example 6 explains with respect to composite filament using polyether terephthalamide as a sheath component.

Figure 2:
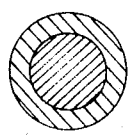
FIGS. 2 – 6 are cross-sectional views of sheath-core composite filaments.
Figure 3:
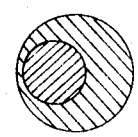

In this Example 6, the dyeing test was effected under the following condition:
Dyestuff:
acid dyestuff,
Coomassic Ultra Sky Blue SE150 (I.C.I.)
Concentration of dyestuff: 3% owf.
Concentration of acetic acid: 3% owf.
Bath ratio: 30
Temperature and time: 30°C — 98°C (heating), 30 minutes
98°C (constant), 40 minutes Polyamide 30403T having an intrinsic viscosity of 0.91 and containing 0.1 percent by weight of triphenyl phosphite and 1 percent by weight of modified polyethylene was used as a sheath component, and polyethylene terephthalate having an intrinsic viscosity of 0.67 was used as a core component. These two spinning materials were conjugate spun in a conjugate ratio of 65/35 (by weight), and the resulting undrawn filaments were drawn to 3.6 times their original length on a draw pin at 90°C to obtain composite filaments $Y_5$ of 70 d/18 f having a cross-section as shown in FIG. 2.

Composite filament $Y_6$ was spun in substantially the same manner as described in the above filaments $Y_5$, except that nylon-6 having an intrinsic viscosity of 1.15 was used as a sheath component.

Drawn filaments $Y_8$ of 70 d/18 f consisting only of the above described nylon-6 were spun.

The initial modulus, charged voltage due to friction and dye receptivity of the filaments $Y_5, Y_6, Y_8$ are shown in the following Table 14.

Table 14

| Filament | | Initial modulus (g/d) | Charged voltage (V) | Dye receptivity (%) |
|---|---|---|---|---|
| $Y_5$ | (present invention) | 58.2 | 800 | 52.3 |
| $Y_6$ | (control) | 46.5 | 2500 | 42.1 |
| $Y_8$ | (nylon-6) | 19.5 | 2500 | 45.7 |

Table 14 shows that the filament according to the present invention is excellent in initial modulus, antistatic property and dye receptivity.

Figure 4:
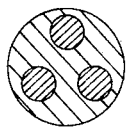
Figure 5:
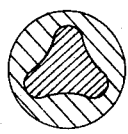

Next, polyethylene oxybenzoate having an intrinsic viscosity of 0.71 was used as a core component and the polyamide 30403T used in the filament $Y_5$ was used as a sheath component. These two spinning materials were conjugate spun in a conjugate ratio of 1/3 (by weight), and the undrawn filaments were drawn to 3.7 times their original length at 100°C to obtain multi-core composite filaments $Y_9$ having a cross-section as shown in FIG. 4.

Composite filaments $Y_{10}$ of 70 d/18 f were spun in substantially the same manner as described in the filament $Y_9$, except that nylon-66 was used as a sheath component.

Figure 6:
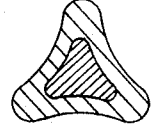
Figure 7:
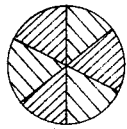
FIGS. 7 – 11 are cross-sectional views of multi-layer filaments.
Figure 8:
Figure 9:
Figure 10:
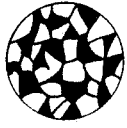
Figure 11:
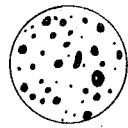

The polyamide 30403T used in the filaments $Y_5$ was used as a sheath component, and polypropylene having a molecular weight of about 120,000 and a melting point of 175°C was used as a core component. These spinning materials were conjugate spun in a conjugate ratio of 3/1, and the undrawn filaments were drawn to 4.4 times their original length at 100°C to obtain composite filaments $Y_{11}$ having a cross-section as shown in FIG. 6.

Composite filaments $Y_{12}$ were spun in substantially the same manner as described in the filaments $Y_{11}$, except that nylon-66 having an intrinsic viscosity of 0.92 was used as a sheath component.

Filaments $Y_{13}$ consisting only of polypropylene was spun in substantially the same manner.

Composite filaments $Y_{14}$ were spun in substantially the same manner as described in the filament $Y_9$, except that polyamide 30303T having an intrinsic viscosity of 0.99 and containing 0.1 percent by weight of diphenyl phosphite and 1 percent by weight of modified polyethylene was used as a sheath component, and the conjugate ratio was 1/1.

The initial modulus, charged voltage due to friction and dye receptivity of the above filaments $Y_9 - Y_{14}$ are shown in the following Table 15.

Table 15

| Filament | | Initial Modulus (g/d) | Charged voltage (V) | Dye receptivity (%) |
|---|---|---|---|---|
| $Y_9$ | (present invention) | 55.8 | 800 | 50.4 |
| $Y_{10}$ | (control) | 42.1 | 2300 | 43.7 |
| $Y_{11}$ | (present invention) | 45.6 | 800 | 50.3 |
| $Y_{12}$ | (control) | 32.0 | 2500 | 41.1 |
| $Y_{13}$ | (control) | 52.5 | -3000 | 4.5 |
| $Y_{14}$ | (present invention) | 68.0 | 700 | 45.9 |

Table 15 shows that the filament according to the present invention is moderate in initial modulus, and excellent in antistatic property and dye receptivity.

Example 7

Comparative tests of polyamide 30203T, as a control, in comparison with polyamide 30303T and polyamide 30403T, according to the invention.

(1 Preparation of specimens (without using phosphite ester).

An aqueous solution of 100 parts by weight of 30203T salt dissolved in 50 parts by weight of water was fed into an autoclave. After air in the autoclave was replaced by gaseous nitrogen, the 30203T salt was polymerized at a temperature of 230°C for 2 hours under a pressure of about 28 kg/cm², heated up to 265°C in 2 hours while releasing the pressure, and further polymerized at this temperature for 2 hours under a reduced pressure of 10 mmHg to obtain a polyamide 30203T.

An aqueous solution of 100 parts by weight of 30303T salt dissolved in 50 parts by weight of water was fed into an autoclave. After air in the autoclave was replaced by gaseous nitrogen, the 30303T salt was polymerized at a temperature of 210°C for 2 hours under a pressure of about 20 kg/cm², heated up to 245°C in 2 hours while releasing the pressure, and further polymerized at this temperature for 2 hours under a reduced pressure of 10 mmHg to obtain a polyamide 30303T.

An aqueous solution of 100 parts by weight of 30403T salt dissolved in 50 parts by weight of water was fed into an autoclave. After air in the autoclave was replaced by gaseous nitrogen, the 30403T salt was polymerized at a temperature of 200°C for 2 hours under a pressure of about 18 kg/cm², heated up to 245°C in 2 hours while releasing the pressure, and further polymerized at this temperature for 1 hour under a reduced pressure of 50 mmHg to obtain a polyamide 30403T.

The resulting 3 kinds of polyamides were melted, and variations of the intrinsic viscosities of the polyamides due to passage of time in the melted state were measured according to following procedures, and the heat stabilities of the polyamides were compared.

Each polyamide was maintained in the melted state at a temperature (T) of 25°C higher than its respective melting point under a gaseous nitrogen atmosphere, and each of the intrinsic viscosities of the polyamide after 3 minutes and 30 minutes was measured. The obtained results are listed in the following Table 16. In the usual melt spinning process, the polymer is melted at a temperature of 20° to 30°C above its melting point. This test, therefore, shows the results that would occur under conventional melt spinning conditions.

Table 16

| Polyamide | Melting Point (°C) | $[\eta]_P$ | $[\eta]_{M-1}$ | $[\eta]_{M-2}$ | T(°C) |
|---|---|---|---|---|---|
| 30203T | 245 | 0.69 | 0.58 | 0.32 | 270 |
| 30303T | 227 | 0.71 | 0.70 | 0.63 | 252 |
| 30403T | 222 | 0.81 | 0.80 | 0.77 | 247 |

(2) Preparation of specimens (using phosphite esters).

Specimens of polyamides 30203T, 30303T and 30403T were prepared by the same procedures described in (1) above, except that in each case there was included in the starting aqueous solution, 0.1 part of triphenyl phosphite.

Each polyamide was maintained in a melted state at a temperature of 270°C under a gaseous nitrogen atmosphere, and the intrinsic viscosities of each of the polyamides after 3 minutes and 30 minutes was measured. The obtained results are listed in the following Table 17. Table 17 shows the heat stability of the polymers under conditions which are more severe, as to 30303T and 30403T, than would be encountered in conventional melt spinning.

Table 17

| Polyamide | Melting Point (°C) | $[\eta]_P$ | $[\eta]_{M-1}$ | $[\eta]_{M-2}$ | T' (°C) |
|---|---|---|---|---|---|
| 30203T | 252 | 0.98 | 0.97 | 0.51 | 270 |
| 30303T | 231 | 0.96 | 0.96 | 0.87 | 270 |
| 30403T | 224 | 1.02 | 1.00 | 0.90 | 270 |

In the above described procedures, the intrinsic viscosity was measured in m-cresol at 30°C.

In the above Tables 16 and 17:

$[\eta]_P$ = intrinsic viscosity of polyamide just after completion of polymerization.

$[\eta]_{M-1}$ = intrinsic viscosity of polyamide 3 minutes after the polyamide was melted.

$[\eta]_{M-2}$ = intrinsic viscosity of polyamide 30 minutes after the polyamide was melted.

T = temperature for melting polyamide, which is 25°C higher than the melting point of the polyamide.

T' = temperature for melting polyamide.

As seen from the above Tables 16 and 17, the polyamides 30303T and 30403T according to the present invention are superior in heat stability to the polyamide 30203T.

Since the polyamides according to the present invention have an unexpectedly improved heat stability, even when the polyamides 30303T and 30403T are maintained in a melted state for from several minutes to several tens minutes incident to the melt spinning process, thermal decomposition of the polyamide (for example, breakage of main chain due to thermal decomposition) does not occur, and neither coloration nor decrease of viscosity occurs in the polyamide. Consequently, filaments composed of the polyamide 30303T and 30403T have a high modulus and a flexible touch and have no rigid touch. Moreover, in such filaments, no naps are formed, such as occurs when the viscosity and strength of polyamide are decreased.

The embodiments of the invention in which an exclusive property or privilege is claimed are defined as follows:

1. A polyamide having an improved modulus and antistatic property, which consists essentially of a fiber-forming homopolymer of poly-bis(propoxy)alkylene terephthalamide consisting essentially of the recurring structural unit shown by the following formula I

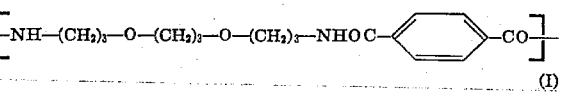

(I)

2. The polyamide as claimed in claim 1, wherein said polyamide is composed of at least 95 percent by weight of said recurring structural unit.

3. The polyamide as claimed in claim 1, wherein said polyamide is composed of at least 97 percent by weight of said recurring structural unit.

4. A polyamide having an improved modulus and antistatic property, which consists essentially of a fiber-forming homopolymer of polybis(propoxy)alkylene terephthalamide consisting essentially of the recurring structural unit shown by the following formula I

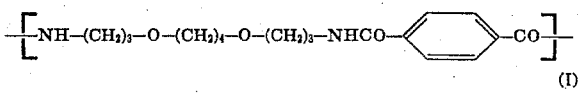

(I)

5. The polyamide as claimed in claim 4, wherein said polyamide is composed of at least 95 percent by weight of said recurring structural unit.

6. The polyamide as claimed in claim 4, wherein said polyamide is composed of at least 97 percent by weight of said recurring structural unit.

* * * * *

UNITED STATES PATENT OFFICE
CERTIFICATE OF CORRECTION

Patent No. 3,843,609     Dated October 22, 1974

Inventor(s) Isao Kimura, Masao Matsui, Hiroshi Takahashi & Shizume Takemoto

It is certified that error appears in the above-identified patent and that said Letters Patent are hereby corrected as shown below:

Column 24, line 50; Please change the formula to read as follows:

Signed and sealed this 14th day of January 1975.

(SEAL)
Attest:

McCOY M. GIBSON JR.　　　　　　　C. MARSHALL DANN
Attesting Officer　　　　　　　　Commissioner of Patents